Patented Apr. 7, 1931

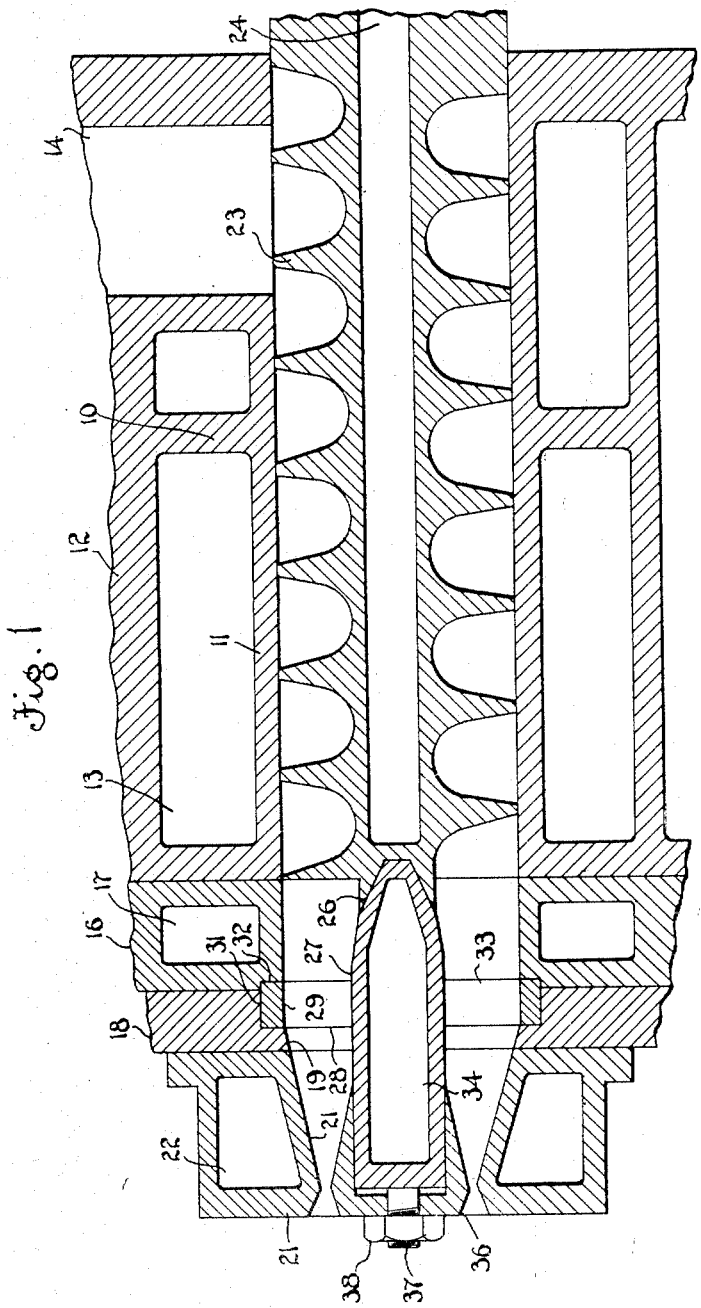

1,800,180

UNITED STATES PATENT OFFICE

RALPH B. DAY, OF AKRON, OHIO, ASSIGNOR TO THE GOODYEAR TIRE & RUBBER COMPANY, OF AKRON, OHIO, A CORPORATION OF OHIO

METHOD OF PREVENTING OVERHEATING OF RUBBER IN SCREW-TYPE EXTRUDING MACHINES

Application filed November 6, 1929. Serial No. 405,149.

This invention relates to a method of operating rubber manipulating machinery and it has particular relation to the operation of extruding machines of the type in which a screw is employed to force unvulcanized rubber through a die.

One object of the invention is to provide a method of operating machines of the above-designated character whereby the rate of production is materially increased.

Another object of the invention is to prevent scorching of rubber compounds which are being extruded through the machine.

An additional object of the invention is to reduce the consumption of power required to operate the machine.

In extruding unvulcanized rubber by means of a machine of the screw type, much power is consumed in overcoming friction between the surfaces of the machine and the rubber, and also in overcoming the friction created by the kneading action upon the stock. This power is transformed into heat which may become so excessive as to cause premature vulcanization. Since the friction between the rubber compound and the surfaces of the machine is relatively great, the operation of the machine is comparatively inefficient and a great excess of power is thus expended.

In order to reduce the temperature of the machine and the stock, it is customary to provide a jacket about the cylinder of the machine and to form a longitudinally extending passage through the core of the screw. A cooling medium, such as water, is circulated through the space between the jacket and the cylinder and also through the passage in the screw. In this way, a portion of the excess heat is carried away by convection. In the practice of such processes, water having a temperature approximating that of the atmosphere (approximately 74° F.) is usually employed as a cooling fluid. However, rubber is a very poor conductor of heat and as a result the heat generated within the interior of the rubber mass, due to the kneading action created by the relative movement between the walls of the cylinder and the surface of the screw, does not escape to the cooled surface with sufficient rapidity. Therefore, it is necessary to maintain the rate of operation of the machine at a relatively low value in order to prevent excessive temperatures within the interior of the rubber even when the coldest practicable cooling fluid is employed in the machine.

This invention involves the discovery that by employing a relatively hot fluid within the screw and throat of the extruding machine, friction between the surface of the screw and the rubber compound is greatly reduced at the same time back pressure upon the stock, created by friction within the throat of the machine, is also maintained at a minimum value, and as a result, the compound is advanced more rapidly through the machine, and the kneading action upon the compound between the surfaces of the screw and the cylinder is reduced. Therefore, contrary to what would naturally be expected, increase in the temperature of the screw results in a reduction of the temperature of the stock passing through the die of the machine.

For a better understanding of the invention, reference may now be had to the accompanying drawings, forming a part of the specification, of which the single figure is a fragmentary cross-sectional view of an extruding machine showing the cylinder walls and the screw contained therein.

In practicing the invention, an extruding machine of conventional type is employed. This machine comprises a cylinder 10 having inner and outer walls 11 and 12, respectively, defining a chamber 13 for facilitating the circulation of a cooling fluid. Rubber compound is introduced into the cylinder adjacent one end thereof through an opening or hopper 14. The forward end of the cylinder 10 is provided with a throat portion 16 having an annular chamber 17 formed therein for receiving a heating fluid. The throat portion, in turn, is provided upon its forward side with a plate 18 which has a slightly tapered circular opening 19 therein, which is disposed in coaxial alignment with the throat portion 16 and the cylinder 10.

The disc or plate 18 constitutes a support for a die or head portion 21 having a frusto-conical bore which is normally disposed in coaxial alignment with the throat portion 16 and the cylinder 10. The member 21, like the portion 16, is provided with an annular chamber 22, which is connected to a suitable source of supply of heating fluid (not shown).

In order to advance the rubber compound through the cylinder, a rotatably driven screw 23 of conventional design is disposed within the cylinder. The core of the screw is formed with a longitudinally extending passageway 24 to provide for the circulation of a heating fluid. The forward end of the screw is provided with a tapered bearing 26, in which is disposed the rear end of a spindle or mandrel 27 which is normally disposed coaxially within the members 16, 18 and 21. The mandrel is maintained in position within those members by means of a spider 28 having an outer rim 29 which is disposed within grooves 31 and 32 formed within the inner peripheries of the members 16 and 18. The spider also has radially extending spokes 33 which interconnect the spindle 27 and the rim 29. If desired, the spindle 27 may be formed with a longitudinal chamber 34 which communicates through passageways (not shown) in the spokes 33 with a suitable source of heating fluid. The forward end of the mandrel 27 fits within a depression within the rear portion of an internal die element 36, which is disposed within the head or die 21, and which is secured thereto by means of a bolt 37 and a nut 38.

In the operation of the machine, rubber compound which is introduced through the opening or hopper 14, is driven forwardly by the screw and is forced outwardly between the spokes 33 of the spider 31, finally being forced from the machine through the annular space between the die members 21 and 36. During the operation of the machine a constant flow of cooling fluid, which is usually at a temperature approximating that of the atmosphere (approximately 74 or 75° F.) is maintained within the space 13. At the same time, a flow of fluid having a relatively high temperature is maintained within the passageway 24 of the screw 23. The temperature of this fluid may vary within relatively wide limits, although it has been found by practice to be desirable to maintain it between 120° and 190° F. The optimum value appears to be about 180° C. The temperature of the fluid within the chambers 17, 22 and 34 is maintained at approximately the same value as that of the fluid within the passageway 24 of the extruding screw.

The employment of a fluid of relatively high temperature in the screw apparently results in the local heating of the stock which comes into contact with the latter member and, as a result, a film of rubber adjacent the surface of the screw is so softened as to cause it to act as a lubricant between the main body of stock and the surface of the screw. Because of the relatively low coefficient of heat conductivity of the rubber, the heat from the screw does not have time to penetrate the mass of rubber to any appreciable degree. This lubrication of the contacting surfaces greatly reduces the friction between the screw and the stock and thus prevents excessive screw surface friction and kneading of the stock as it passes through the cylinder. Therefore, the excessive increase of temperature within the stock due to internal friction occasioned by the kneading is greatly reduced. Similar lubricating effects and a resultant reduction of resistance is also obtained by the circulation of heated fluid in the passages or chambers 17, 22 and 34.

The increase in efficiency attending the use of heated fluid in the screw and throat of an extruding machine is clearly indicated by the attached data in which the results obtained by operating a machine according to standard practice are compared with the results obtained by operating the same machine in accordance with the principles of this invention. In the first case water at a temperature of approximately 75° F. was employed in both screw throat and barrel. In the second case water at 75° F. was employed in the barrel while that in the screw and throat was increased approximately to 170° F. The speed of the screw and throat was so regulated in both cases that the temperatures of the stock at output were identical.

|  | R. P. M. of screw | Output (feet per minute) |
| --- | --- | --- |
| Standard practice | 101 | 43.5 |
| Hot water in screw | 140 | 71.5 |

It is thus apparent that the increase in the temperature of the water in the above indicated parts of the machine permits a great increase in the output of the machine without any increase in the temperature of the stock at output.

Although I have illustrated only one form which the invention may assume, and have described in detail only a single application thereof, it will be apparent to those skilled in the art that the invention is not so limited, but that various modifications may be made therein without departing from the spirit of the invention or from the scope of the appended claims.

What I claim is:

1. A method of extruding rubber from a machine comprising a cylinder and a core disposed within the cylinder, one of which elements is provided with a screw-thread which comprises cooling the unthreaded member while heating the threaded member.

2. A method of extruding rubber which comprises passing it through a screw type extruding machine in which the outer cylinder is subjected to the action of a cooling fluid while the screw is subjected to the action of a fluid of materially higher temperature than the temperature of the cooling fluid.

3. A method of extruding rubber which comprises passing it through a machine comprising an outer cylinder and an inner core disposed longitudinally within the cylinder and rotatable therein which comprises cooling the cylinder with a fluid at approximately room temperature and heating the screw with fluid at a temperature ranging from 120° to 190° F.

4. A method of extruding rubber from screw type extruding machines which comprises passing the rubber through the machine while maintaining the temperature of the screw and the throat of the machine at a substantially higher temperature than the barrel of the latter.

5. A method of operating an extruding machine for extruding rubber having a cylinder, a throat for the cylinder and a screw within the cylinder for forcing the rubber therethrough which comprises circulating a relatively cool fluid about the cylinder and a fluid at a temperature of 120° to 190° F. through the screw and the throat of the machine.

6. A method of operating a machine for extruding rubber which comprises positively cooling certain parts of the machine to temperatures below that of the rubber compound being extruded while other parts of the machine are heated to temperatures materially above that of the rubber compound whereby to increase the frictional resistance between the compound and the cooled parts of the machine, and to decrease the resistance between the compound and the heated parts.

In witness whereof, I have hereunto signed my name.

Signed at Akron, in the county of Summit and State of Ohio, U. S. A., this 4th day of November, 1929.

RALPH B. DAY.